(12) United States Patent
Na et al.

(10) Patent No.: US 7,551,682 B2
(45) Date of Patent: Jun. 23, 2009

(54) METHOD FOR IMPROVING THE PERFORMANCE OF A WIRELESS NETWORK UTILIZING BEAMFORMING WEIGHTING VECTORS

(75) Inventors: Yanxin Na, Plano, TX (US); Hang Jin, Plano, TX (US)

(73) Assignee: Cisco Technology, Inc., San Jose, CA (US)

(*) Notice: Subject to any disclaimer, the term of this patent is extended or adjusted under 35 U.S.C. 154(b) by 15 days.

(21) Appl. No.: 11/874,849

(22) Filed: Oct. 18, 2007

(65) Prior Publication Data

US 2008/0102898 A1     May 1, 2008

Related U.S. Application Data

(60) Provisional application No. 60/854,217, filed on Oct. 25, 2006.

(51) Int. Cl.
*H04L 1/02* (2006.01)
*H04B 1/69* (2006.01)

(52) U.S. Cl. .................. 375/267; 375/347; 375/144

(58) Field of Classification Search ............ 375/295, 375/297, 259, 267, 347; 455/101, 132
See application file for complete search history.

(56) References Cited

U.S. PATENT DOCUMENTS

| | | | |
|---|---|---|---|
| 5,974,106 | A | 10/1999 | Dupont et al. |
| 6,694,155 | B1 | 2/2004 | Chin et al. |
| 6,850,741 | B2 * | 2/2005 | Lei et al. ............... 455/101 |
| 2004/0071222 | A1 * | 4/2004 | Liang et al. ............. 375/267 |
| 2004/0152491 | A1 * | 8/2004 | Lobinger et al. .......... 455/561 |
| 2006/0281494 | A1 * | 12/2006 | Wilson et al. ............ 455/562.1 |
| 2008/0037681 | A1 * | 2/2008 | Walton et al. ............ 375/267 |

OTHER PUBLICATIONS

PCT International Search Report and Written Opinion in counterpart International Application No. PCT/US07/81949, dated Mar. 17, 2008.

* cited by examiner

*Primary Examiner*—Tesfaldet Bocure
(74) *Attorney, Agent, or Firm*—Edell, Shapiro & Finnan, LLC

(57) ABSTRACT

Techniques are provided for selecting one or more downlink beamforming vectors for a wireless channel to create beamformed signals between a first wireless communication device, e.g., a base transceiver station (BTS) and a second wireless communication device, e.g., a mobile station (MS). The method comprises estimating a downlink channel covariance matrix from an uplink covariance matrix of the wireless channel, wherein the uplink covariance matrix is computed based on uplink signals received at the first wireless communication device from the second wireless communication device. A plurality of candidate downlink beamforming weighting vectors are generated from the uplink covariance matrix. Each of the candidate downlink beamforming weighting vectors are applied to a corresponding downlink signal for transmission via the plurality of antennas of the first wireless communication device to the second wireless communication device such that multiple downlink signals are transmitted from the first wireless communication device to the second wireless communication device, each downlink signal with a different one of the plurality of candidate downlink beamforming weighting vectors. Feedback messages are received at the first wireless communication device from the second wireless communication device, where the feedback messages indicate reception quality of downlink signals received by the second wireless communication device from the first wireless communication device. One or more of the candidate downlink beamforming weighting vectors is selected for use in transmitting downlink signals from the first wireless communication device to the second wireless communication device based on the feedback messages.

29 Claims, 1 Drawing Sheet

METHOD FOR IMPROVING THE PERFORMANCE OF A WIRELESS NETWORK UTILIZING BEAMFORMING WEIGHTING VECTORS

CROSS REFERENCE

The present application claims the benefit of U.S. Provisional Application Ser. No.60/854,217, which was filed on Oct. 25, 2006.

BACKGROUND

In a wireless communications network employing beamforming techniques, the quality of downlink signals received by a mobile station (MS) from a base transceiver station (BTS) is determined by beamforming weighting vectors used for transmitting signals on a downlink channel, which beamforming weight vectors are created from the covariance matrix of the downlink channel. However, lack of information about channel coefficients of the downlink channel makes it difficult for the BTS to obtain optimal downlink beamforming weighting vectors, especially in a fast fading environment employing frequency division duplex (FDD) or time division duplex (TDD) techniques.

A downlink beamforming weighting vector can be computed using a downlink channel covariance matrix, which is obtained from an uplink channel covariance matrix. Since the BTS transmits signals to an MS using the downlink beamforming weighting vector, it needs the MS to provide constant feedback on the performance of the network. The feedback received from the MS helps the BTS to decide how to modify the downlink beamforming weighting vectors in order to maintain or enhance the performance of the wireless network.

In a conventional wireless network, the BTS applies a beamforming weighting vector to signals to be transmitted via multiple BTS antennas to the antennas of the MS before transmitting signals to the MS. The BTS continues transmitting signals with the same beamforming weighting vector. Since channel conditions are not static, the same weight vector may not consistently yield the same level of network performance.

As such, what is desired is a method for improving the performance of the wireless network utilizing a set of beamforming weighting vectors according to the feedback received from an MS.

SUMMARY

Techniques are provided for selecting one or more downlink beamforming vectors for a wireless channel to create beamformed signals. The method comprises estimating a downlink channel covariance matrix from an uplink covariance matrix of the wireless channel A plurality of candidate downlink beamforming weighting vectors are generated from the uplink covariance matrix. Each of the candidate downlink beamforming weighting vectors are applied to a corresponding downlink signal for transmission via the plurality of antennas of the first wireless communication device to the second wireless communication device such that multiple downlink signals are transmitted from the first wireless communication device to the second wireless communication device, each downlink signal with a different one of the plurality of candidate downlink beamforming weighting vectors. Feedback messages are received at the first wireless communication device from the second wireless communication device, where the feedback messages indicates reception quality of downlink signals received by the second wireless communication device from the first wireless communication device. One or more of the candidate downlink beamforming weighting vectors is selected for use in transmitting downlink signals from the first wireless communication device to the second wireless communication device based on the feedback messages.

DESCRIPTION

Figure 1:
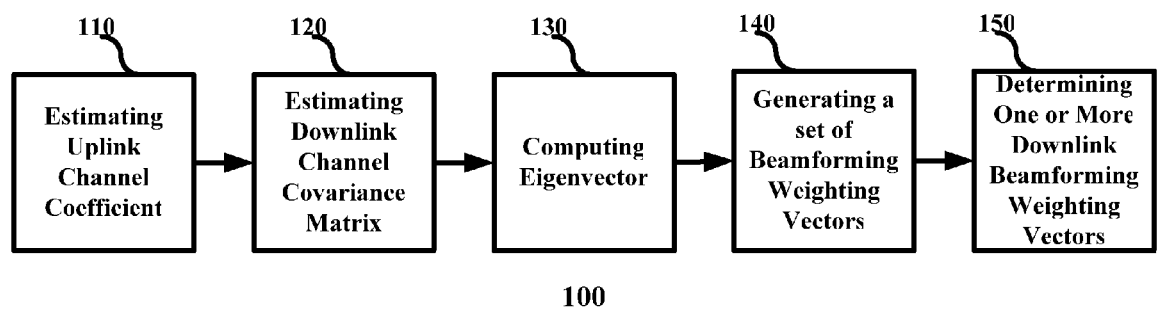
FIG. 1 is a flow chart diagram illustrating a method in accordance with the present invention.

Techniques are disclosed herein for selecting one or more dominant downlink beamforming weighting vectors that yield the best performance for a wireless communication. The selection of the one or more dominant downlink beamforming weighting vectors is based on a probing-and-feedback method. In other words, out of a set of downlink beamforming weighting vectors, a base transceiver station (BTS) chooses at least one vector that yields the best performance based on feedback received from a mobile station (MS).

The techniques described herein significantly improve the efficiency of generating beamforming weighting vectors of a downlink channel in Macrocell/Microcell systems without incurring high computational complexity. These techniques are described herein in connection with a network employing frequency division duplex (FDD) Orthogonal Frequency Division Multiple Access (OFDMA). Nonetheless, the techniques can be easily extended to wireless networks employing TDD/FDD Code Division Multiple Access (CDMA) or TDD/FDD OFDMA due to the fact that in these methods an uplink channel covariance matrix is also used to generate a downlink channel covariance matrix from which downlink beamforming weighting vectors are calculated.

In an FDD system, a downlink channel covariance matrix is obtained by having a predetermined speculative transformation matrix multiplied by an uplink channel covariance matrix. A predetermined speculative transformation matrix is a function of system parameters of a wireless network. The parameters include the number of antennas, the spacing of antennas, the number of sectors, and uplink and downlink carrier frequencies. By contrast, in a TDD system an uplink channel covariance matrix is used as a downlink channel covariance matrix.

After downlink beamforming weighting vectors are generated from a downlink channel covariance matrix, they are ranked according to some predetermined rules. A predetermined number of highest-ranking downlink beamforming weighting vectors are selected for generating beamformed signals. Each of the selected beamforming weighting vectors is applied to signals to be transmitted via the antenna array of the BTS and the beamformed signals are transmitted to an MS. The MS sends the BTS feedback about the performance of the network regularly. The BTS uses the feedback to determine the selection of one or more beamforming weighting vectors for subsequent transmissions of downlink signals.

FIG. 1 is a flow chart diagram illustrating a method in accordance with one embodiment of the present invention. In step 110, channel coefficients of an uplink channel for a desired wireless station is estimated to be $H_{ul}=[H_{ul,1}\ H_{ul,2} \ldots H_{ul,M}]^T$, where operator $[*]^T$ represents vector transposition operation and M is the number of antennas in a BTS. Let $R_{ul}$ be an uplink channel covariance matrix. An uplink instantaneous channel covariance matrix is computed according to the following equation: $R_{ul}=H_{ul}(H_{ul})^H$, where operator $[*]^H$ represents Hermitian operation. An uplink average channel covariance matrix is computed according to the following equation:

$$R_{ul} = \frac{1}{N_e}\sum_{i=1}^{N_e} H_{i,ul}(H_{i,ul})^H,$$

where $N_e$ is the number of samples and $N_e$ is between $[1,\infty)$.

In step 120, a downlink channel covariance matrix is computed by using an uplink channel covariance matrix. In an FDD system the computation is based on the following equation: $R_{dl}=R_{ul}C_T$, where $R_{dl}$ is a downlink channel covariance matrix; $R_{ul}$ is an uplink channel covariance matrix; and $C_T$ is a predetermined speculative transformation matrix. The speculative transformation matrix $C_T$ is an M by M matrix. On the other hand, in a TDD system the computation is based on the following equation: $R_{dl}=R_{ul}$ In step 130, by using singular value decomposition (SVD), a sorted list of M eigenvalues is obtained from the downlink channel covariance matrix. Let $\{\lambda_1, \lambda_2, \ldots, \lambda_M\}$ denote M eigenvalues of a downlink channel covariance matrix $R_{dl}$ with $|\lambda_1| \geq |\lambda_2| \geq \ldots \geq |\lambda_M|$, where $|\lambda_i|$ is the absolute value of the ith eigenvalue $\lambda_i$.

The SVD process also yields a set of M eigenvectors that corresponds to the set of M eigenvalues. Let the M eigenvectors be $\{U_1, U_2, \ldots, U_M\}$, where an M by 1 vector $U_i$ is normalized as the Euclidean norm of vector $U_i$, i.e. $\|U_i\|= \sqrt{U_i^H U_i}=1$.

According to a predetermined rule, downlink beamforming weighting vectors are generated from the set of eigenvectors and ranked (see step 140). The table below shows a set of beamforming weighting vectors, and the first column represents the rank of a beamforming weighting vector.

| Priority level | Weighting Vector $W_i$ (M by 1) |
|---|---|
| 1 | $W_1 = U_1$ |
| 2 | $W_2 = U_2$ |
| 3 | $W_3 = (aU_1 + bU_2)/((aU_1 + bU_2)^H (aU_1 + bU_2))$ |
| 4 | $W_4 = H_{UL}$ |
| 5 | $W_5 = U_3$ |
| 6 | $W_6 = U_4$ |

The coefficients a and b of a beamforming weighting vector $W_3$ are predetermined according to channel condition.

The BTS selects one or more highest-ranking downlink beamforming weighting vectors as candidates for creating beamformed signals. It applies one vector at a time to the antenna array of the BTS (step 150), and the beamformed signals are transmitted to a MS.

The MS that receives transmitting signals from the BTS assesses the quality of the receiving signals and returns feedback to the BTS. The feedback from the MS is sent in one or a combination of the following forms: an acknowledgement (ACK) or a negative acknowledgement (NAK) message depending on whether signal quality exceeds a predetermined threshold and a grading message indicating the grade of receiving signals. The grades for receiving signals are good, fair and bad in a three-level grading system. On the other hand, the grades are very good, good, fair, bad and very bad in a five-level grading system.

In one form, feedback is sent as an ACK or NAK message. According to the ranking of beamforming weighting vectors, the BTS chooses a first dominant beamforming weighting vector from the set of the beamforming weighting vectors used to create beamformed signals. If the BTS receives an ACK message from the MS, the BTS continues using the first dominant beamforming weighting vector until the MS returns a NAK message indicating that the quality of signals is below a predetermined threshold. Consequently, the BTS selects a second dominant beamforming weighting vector according to the rank from the set of the beamforming weighting vectors to create beamformed signals. This embodiment of the present invention incurs no additional overhead and it only uses one beamforming weighting vector at a time to transmit signals.

In another form, feedback from the MS is sent as a grading message. The BTS chooses multiple dominant beamforming weighting vectors from the set of beamforming weighting vectors. The BTS uses the dominant beamforming weighting vectors sequentially to create beamformed signals. The MS assesses the quality of the received signals transmitted using each dominant beamforming weighting vector and returns a grading message to the BTS. The BTS uses the feedback from the MS and determines how to use the dominant beamforming weighting vectors according to a predetermined rule.

For example, if one beamforming weighting vector has a grade better than the rest, the BTS uses the dominant beamforming weighting vector to transmit signals. However, if multiple beamforming weighting vectors have a grade better than the rest, the BTS uses these multiple dominant beamforming weighting vectors to create beamformed signals according to a predetermined coding method, which increases the diversity and the coding gain of the wireless network.

In still another form, the feedback from the MS includes an ACK message and a grading message. Based on the information contained in both ACK and grading messages, the BTS selects one or more dominant beamforming weighting vectors to transmit signals.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
    at a first wireless communication device comprising a plurality of antennas, receiving uplink signals from a second wireless communication device that comprises a plurality of antennas and computing an uplink covariance matrix for an uplink channel between the first and second wireless communication devices from the received uplink signals;
    generating a plurality of candidate downlink beamforming weighting vectors from the uplink covariance matrix; and applying each of the candidate downlink beamforming weighting vectors to a corresponding downlink signal for transmission via the plurality of antennas of the first wireless communication device to the second wireless communication device such that multiple downlink signals are transmitted from the first wireless communication device to the second wireless communication device, each downlink signal with a different one of the plurality of candidate downlink beamforming weighting vectors;

receiving at the first wireless communication device feedback messages from the second wireless communication device, wherein the feedback messages indicate reception quality of downlink signals received by the second wireless communication device from the first wireless communication device;

selecting one or more of the candidate downlink beamforming weighting vectors for use in transmitting downlink signals from the first wireless communication device to the second wireless communication device based on the feedback messages received from the second wireless communication device.

2. The method of claim 1, wherein generating the plurality of candidate downlink beamforming weighting vectors comprises:

computing a downlink channel covariance matrix from the uplink channel covariance matrix;

calculating a plurality of eigenvalues based on the downlink channel covariance matrix;

generating a plurality of eigenvectors corresponding to the plurality of eigenvalues;

computing a plurality of downlink beamforming weighting vectors from the plurality of eigenvectors; and ranking the plurality of downlink beamforming weighting vectors according to a predetermined rule.

3. The method of claim 2, wherein computing the downlink channel covariance matrix comprises assigning the uplink channel covariance matrix as the downlink channel covariance matrix for use when the first and second wireless communication devices employ time division duplex (TDD) techniques.

4. The method of claim 2, wherein computing the downlink channel covariance matrix comprises multiplying the uplink channel covariance matrix by a predetermined speculative transformation matrix for use when the first and second wireless communication devices employ frequency division duplex (FDD) techniques.

5. The method of claim 2, wherein selecting one or more candidate downlink beamforming vectors comprises selecting one or more highest ranking candidate downlink beamforming weighting vectors.

6. The method of claim 2, wherein applying comprises first applying a highest ranking downlink beamforming weighting vector to a downlink signal for transmission from the first wireless communication device to the second wireless communication device and continuing to use the highest ranking beamforming weighting vector for transmitting downlink signals to the second wireless communication device until receiving a feedback message from the second wireless communication device indicating that quality of reception of downlink signals is less than a predetermined threshold.

7. The method of claim 6, wherein in response to receiving a feedback message from the second wireless communication device indicating that the quality of reception of downlink signals sent with the highest ranking beamforming weighting vector is less than the predetermined threshold, further comprising selecting a next highest ranking beamforming weighting vector for transmitting downlink signals from the first wireless communication device to the second wireless communication device and continuing to use the next highest ranking beamforming weighting vector until receiving a feedback message from the second wireless communication device that quality of reception of downlink signals is less than the predetermined threshold.

8. The method of claim 1, wherein receiving feedback messages comprises receiving an acknowledgment message sent by the second wireless communication device when the second wireless communication device determines that signal quality of a received downlink signal exceeds a predetermined threshold.

9. The method of claim 1, wherein receiving feedback messages comprises receiving a negative acknowledgment message sent by the second wireless communication device when the second wireless communication device determines that signal quality of a received downlink signal is less than a predetermined threshold.

10. The method of claim 1, wherein receiving feedback messages comprises receiving a grading message sent by the second wireless communication device, wherein the grading message indicates a level of signal quality determined by the second wireless communication device for a received downlink signal.

11. The method of claim 1, wherein applying comprises sequentially applying the candidate downlink beamforming weighting vectors to corresponding downlink signals to create a plurality of beamformed signals for sequential transmission from the first wireless communication device to the second wireless communication device, wherein receiving feedback messages comprises receiving feedback messages indicating quality of reception for received downlink signals sent using corresponding ones of the plurality of candidate downlink beamforming weighting vectors, and selecting comprises selecting one or more of the candidate beamforming weighting vectors based on the feedback messages according to a predetermined rule.

12. The method of claim 11, wherein selecting comprises selecting one of the plurality of candidate downlink beamforming weighting vectors for which the corresponding feedback message indicates a best quality of reception of downlink signals.

13. The method of claim 11, wherein selecting comprises selecting two or more candidate downlink beamforming weighting vectors for which the corresponding feedback messages indicate better signal quality of downlink signals than for other candidate downlink beamforming weighting vectors, wherein the two or more candidate downlink used to create beamformed signals according to a predetermined coding method.

14. A method comprising:

at a first wireless communication device comprising a plurality of antennas, receiving uplink signals from a second wireless communication device that comprises a plurality of antennas and computing an uplink covariance matrix for an uplink channel between the first and second wireless communication devices from the received uplink signals;

estimating a downlink channel covariance matrix by setting it equal to the uplink channel covariance matrix when the first and second wireless communication devices communicate with each other using time division duplex (TDD) techniques;

computing a plurality of eigenvalues by applying singular value decomposition to the downlink channel covariance matrix, sorting the plurality of eigenvalues, and computing a plurality of eigenvectors corresponding to the plurality of eigenvalues;

generating a plurality of candidate downlink beamforming weighting vectors from the plurality of eigenvectors;

applying each of the candidate downlink beamforming weighting vectors to a corresponding downlink signal for transmission via the plurality of antennas of the first wireless communication device to the second wireless communication device such that multiple downlink signals are transmitted from the first wireless communication device to the second wireless communication device, each downlink signal with a different one of the plurality of candidate downlink beamforming weighting vectors;

receiving at the first wireless communication device feedback messages from the second wireless communication device, wherein the feedback messages indicate reception quality of downlink signals received by the second wireless communication device from the first wireless communication device; and selecting one or more of the candidate downlink beamforming weighting vectors for use in transmitting downlink signals from the first wireless communication device to the second wireless communication device based on the feedback messages received from the second wireless communication device.

15. The method of claim 14, wherein generating the plurality of candidate downlink beamforming weighting vectors comprising ranking the plurality of eigenvectors according to a predetermined rule.

16. The method of claim 15, wherein selecting one or more candidate downlink beamforming vectors comprises selecting one or more highest ranking candidate downlink beamforming weighting vectors.

17. The method of claim 15, wherein applying comprises first applying a highest ranking downlink beamforming weighting vector to a downlink signal for transmission from the first wireless communication device to the second wireless communication device and continuing to use the first highest ranking beamforming weighting vector for transmitting downlink signals to the second wireless communication device until receiving a feedback message from the second wireless communication device indicating that quality of reception of downlink signals is less than a predetermined threshold.

18. The method of claim 17, wherein in response to receiving a feedback message from the second wireless communication device indicating that the quality of reception of downlink signals sent with the highest ranking beamforming weighting vector is less than the predetermined threshold, further comprising selecting a next highest ranking beamforming weighting vector for transmitting downlink signals from the first wireless communication device to the second wireless communication device and continuing to use the next highest ranking beamforming weighting vector until receiving a feedback message from the second wireless communication device that quality of reception of downlink signals is less than the predetermined threshold.

19. The method of claim 14, wherein applying comprises sequentially applying the candidate downlink beamforming weighting vectors to corresponding downlink signals to create a plurality of beamformed signals for sequential transmission from the first wireless communication device to the second wireless communication device, wherein receiving feedback messages comprises receiving feedback messages indicating quality of reception for received downlink signals sent using corresponding ones of the plurality of candidate downlink beamforming weighting vectors, and selecting comprises selecting one or more of the candidate beamforming weighting vectors based on the feedback messages according to a predetermined rule.

20. The method of claim 19, wherein selecting comprises selecting one of the plurality of candidate downlink beamforming weighting vectors for which the corresponding feedback message indicates a best quality of reception of downlink signals.

21. The method of claim 19, wherein selecting comprises selecting two or more candidate downlink beamforming weighting vectors for which the corresponding feedback messages indicate better signal quality of downlink signals than for other candidate downlink beamforming weighting vectors, wherein the two or more candidate downlink used to create beamformed signals according to a predetermined coding method.

22. A method comprising:

at a first wireless communication device comprising a plurality of antennas, receiving uplink signals from a second wireless communication device that comprises a plurality of antennas and computing an uplink covariance matrix for an uplink channel between the first and second wireless communication devices from the received uplink signals;

estimating a downlink channel covariance matrix by multiplying the uplink channel covariance matrix by a predetermined speculative transformation matrix when the first and second wireless communication devices communicate with each other using frequency division duplex (FDD) techniques;

computing a plurality of eigenvectors by calculating a plurality of eigenvalues based on the downlink channel covariance matrix, sorting the plurality of eigenvalues, and computing a plurality of downlink eigenvectors corresponding to the plurality of eigenvalues;

generating a plurality of candidate downlink beamforming weighting vectors from the plurality of eigenvectors;

applying each of the candidate downlink beamforming weighting vectors to a corresponding downlink signal for transmission via the plurality of antennas of the first wireless communication device to the second wireless communication device such that multiple downlink signals are transmitted from the first wireless communication device to the second wireless communication device, each downlink signal with a different one of the plurality of candidate downlink beamforming weighting vectors;

receiving at the first wireless communication device feedback messages from the second wireless communication device, wherein the feedback messages indicate reception quality of downlink signals received by the second wireless communication device from the first wireless communication device; and selecting one or more of the candidate downlink beamforming weighting vectors for use in transmitting downlink signals from the first wireless communication device to the second wireless communication device based on the feedback messages received from the second wireless communication device.

23. The method of claim 22, wherein generating the plurality of candidate downlink beamforming weighting vectors comprising ranking the plurality of eigenvectors according to a predetermined rule.

24. The method of claim 23, wherein selecting one or more candidate downlink beamforming vectors comprises selecting one or more highest ranking candidate downlink beamforming weighting vectors.

25. The method of claim 23, wherein applying comprises first applying a highest ranking downlink beamforming weighting vector to a downlink signal for transmission from the first wireless communication device to the second wireless communication device and continuing to use the highest ranking beamforming weighting vector for transmitting downlink signals to the second wireless communication device until receiving a feedback message from the second wireless communication device indicating that quality of reception of downlink signals is less than a predetermined threshold.

26. The method of claim 25, wherein in response to receiving a feedback message from the second wireless communication device indicating that the quality of reception of downlink signals sent with the highest ranking beamforming weighting vector is less than the predetermined threshold, further comprising selecting a next highest ranking beamforming weighting vector for transmitting downlink signals from the first wireless communication device to the second wireless communication device and continuing to use the next highest ranking beamforming weighting vector until receiving a feedback message from the second wireless communication device that quality of reception of downlink signals is less than the predetermined threshold.

27. The method of claim 22, wherein applying comprises sequentially applying the candidate downlink beamforming weighting vectors to corresponding downlink signals to create a plurality of beamformed signals for sequential transmission from the first wireless communication device to the second wireless communication device, wherein receiving feedback messages comprises receiving feedback messages indicating quality of reception for received downlink signals sent using corresponding ones of the plurality of candidate downlink beamforming weighting vectors, and selecting comprises selecting one or more of the candidate beamforming weighting vectors based on the feedback messages according to a predetermined rule.

28. The method of claim 27, wherein selecting comprises selecting one of the plurality of candidate downlink beamforming weighting vectors for which the corresponding feedback message indicates a best quality of reception of downlink signals.

29. The method of claim 27, wherein selecting comprises selecting two or more candidate downlink beamforming weighting vectors for which the corresponding feedback messages indicate better signal quality of downlink signals than for other candidate downlink beamforming weighting vectors, wherein the two or more candidate downlink used to create beamformed signals according to a predetermined coding method.

\* \* \* \* \*